(12) United States Patent
Kato (10) Patent No.: US 8,697,304 B2
(45) Date of Patent: Apr. 15, 2014

(54) HEAT INSULATION CELL FOR FUEL CELL AND MANUFACTURING METHOD OF THE SAME

(75) Inventor: Chisato Kato, Aichi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 405 days.

(21) Appl. No.: 12/521,850

(22) PCT Filed: Dec. 20, 2007

(86) PCT No.: PCT/JP2007/075225
§ 371 (c)(1),
(2), (4) Date: Jun. 30, 2009

(87) PCT Pub. No.: WO2008/081911
PCT Pub. Date: Jul. 10, 2008

(65) Prior Publication Data
US 2010/0040923 A1    Feb. 18, 2010

(30) Foreign Application Priority Data

Jan. 5, 2007    (JP) .................. 2007-000497

(51) Int. Cl.
*H01M 8/04*    (2006.01)
*H01M 2/08*    (2006.01)

(52) U.S. Cl.
USPC .......................... 429/433; 429/508

(58) Field of Classification Search
USPC ................................. 429/400–535
See application file for complete search history.

(56) References Cited

U.S. PATENT DOCUMENTS

| 2,083,622 | A | * | 6/1937 | Summers ........................ 52/1 |
| 2004/0157099 | A1 | * | 8/2004 | Kato et al. .................... 429/26 |
| 2006/0110649 | A1 | * | 5/2006 | Nishiyama et al. ............ 429/38 |

FOREIGN PATENT DOCUMENTS

| CN | 2700431 Y | 5/2005 |
| JP | 7-326379 A | 12/1995 |
| JP | 2002-184449 A | 6/2002 |
| JP | 2004-152502 A | 5/2004 |
| JP | 2004-342516 A | 12/2004 |
| JP | 2006-99992 A | 4/2006 |
| JP | 2006-147502 A | 6/2006 |
| WO | 2002/041425 A2 | 5/2002 |

* cited by examiner

*Primary Examiner* — Jonathan G Leong
(74) *Attorney, Agent, or Firm* — Kenyon & Kenyon LLP (57) ABSTRACT

The deformation of a plate-like member (a separator) or the degradation of a seal function due to heat generated during power generation is suppressed. To realize this, disclosed is a heat insulation cell for a fuel cell in which an insulation layer is constituted of one or more plate-like members and a seal member, the heat insulation cell being provided with a communication section which is disposed in at least a part of a seal line formed by the seal member to seal the insulation layer and the outside of the cell and which connects the insulation layer to the outside. A portion provided with the communication section in at least one of the plate-like members preferably has a projection. It is also preferable that the insulation layer is formed by an insulation member and that the insulation member is disposed in the communication section.

6 Claims, 6 Drawing Sheets

HEAT INSULATION CELL FOR FUEL CELL AND MANUFACTURING METHOD OF THE SAME

This is a 317 national phase application of PCT/JP2007/075225 filed 20 Dec. 2007, which claims priority to Japanese Patent Application No. 2007-000497 filed 5 Jan. 2007, the contents of which are incorporated herein by reference.

BACKGROUND OF THE INVENTION

1. Field of the Invention

The present invention relates to a heat insulation cell for a fuel cell and a manufacturing method of the same. More particularly, the present invention relates to the improvement of a structure of a heat insulation cell for a fuel cell.

2. Description of Related Art

In general, a fuel cell (e.g., a polymer electrolyte fuel cell) has a constitution in which a plurality of cells each including an electrolyte sandwiched between separators are stacked, but at the end of a stack member (a cell stack) including the stacked cells in a stack direction, a temperature easily lowers owing to heat exchange between the end and the atmosphere. Meanwhile, a constitution is known in which, for example, a so-called heat insulation cell having an air layer constituted of a closed space or the like is provided to form an insulation layer, thereby suppressing the lowering of the temperature due to the heat exchange with the atmosphere (e.g., see Patent Document 1).

[Patent Document 1] Japanese Patent Application Laid-Open No. 2002-184449

SUMMARY OF THE INVENTION

However, the influence of heat generated during power generation causes possibilities that a gas in a closed portion of a heat insulation cell for a fuel cell expands and that a separator is deformed or a seal function in a peripheral seal portion deteriorates.

To solve this problem, an object of the present invention is to provide a heat insulation cell for a fuel cell which suppresses the deformation of a separator (a plate-like member) or the deterioration of a seal function due to heat generated during power generation, and a manufacturing method of the same.

To achieve such an object, the present inventor has performed various investigations. The above-mentioned heat insulation cell for the fuel cell has a cell structure similar to that of another cell, and is often similar or approximate to the other cell in a portion such as a seal structure using a seal member, except that instead of a membrane-electrode assembly of the other cell, a conductive plate having excellent insulation properties is sandwiched. In this case, a closed air layer formed at the end of a cell stack member (a cell stack) has an advantage that so-called contamination can be suppressed, but has a disadvantage that the seal function might deteriorate as described above. The present inventor has performed further investigations with this point taken into consideration, and has obtained a new finding to achieve such an object.

The present invention has been developed based on such a finding, and provides a heat insulation cell for a fuel cell in which an insulation layer is constituted of one or more plate-like members and a seal member, the heat insulation cell being provided with a communication section which is disposed in at least a part of a seal line formed by the seal member to seal the insulation layer and the outside of the cell and which connects the insulation layer to the outside.

For example, in a conventional structure in which air exchange between a region including an insulation member and the outside cannot be realized, an internal pressure changes owing to thermal expansion/contraction during an operation. In such a case, a gas in the region sealed with the seal line expands or contracts, and the influence of such a change is exerted on the plate-like member (the separator), whereby the pressure of a contact surface between the insulation member and the plate-like member might change, and the resistance of the whole heat insulation cell might change. Moreover, when a force changes, the plate-like member itself is displaced or deformed, and a surface pressure to the adjacent cell becomes uneven sometimes. When such a situation occurs, a power generation performance in the cell stack member might deteriorate, and the insulating function of the heat insulation cell might change in accordance with a use temperature. On the other hand, according to the heat insulation cell for the fuel cell of the present invention, when the gas (air) in the insulation layer expands owing to the influence of the heat generated during the power generation, the gas can pass through the communication section to escape to the outside. In consequence, while securing the insulating function of the insulation layer, the deterioration of the seal function in the seal portion around the plate-like member due to the influence of the heat can be suppressed.

In the heat insulation cell for the fuel cell according to the present invention, a portion provided with the communication section in at least one of the plate-like members has a projection. The projection disposed on the portion provided with the communication section in this manner can function so that the communication section formed in at least a part of the seal line has a uniform width and so that a region constituting an air hole has a constant size. Moreover, when such a projection is formed so as to abut on, for example, another plate-like member, the projection becomes a stopper for inhibiting the plate-like member from being deformed during the manufacturing of the heat insulation cell. In a case where the seal member is sufficiently pressurized and joined while the seal member does not easily flow, a seal performance can be improved.

The projection is preferably constituted of at least two projecting portions which define the communication section. In this case, the projection may be formed with such a height that the projection does not come in contact with a part of the other plate-like member or with such a height that the projection comes in contact with a part of the other plate-like member.

Moreover, it is also preferable that the insulation layer is formed by an insulation member and that the insulation member is disposed in the communication section. For example, in a structure in which a part of the insulation member is sandwiched between one or more plate-like members, the sandwiched part of the insulation member can function so as to inhibit the plate-like member from being deformed owing to the influence of an external force.

Furthermore, the seal line may be formed only in the outer periphery of a manifold for a reactant gas or a refrigerant. From a viewpoint that the seal line be formed only at a minimum necessary portion, the seal line around the insulation member can be omitted.

Moreover, according to the present invention, there is provided a manufacturing method of a heat insulation cell for a fuel cell in which an insulation layer is constituted of one or more plate-like members and a seal member, the method comprising the steps of: providing a projection projecting toward another cell on at least one plate-like member, wherein the projection constitutes a discontinued portion in at least a part of the seal member, and the discontinued portion forms a communication section which connects the insulation layer to the outside. In such a case, it is possible to securely form, during the manufacturing, a circulating portion (an air discharge passage) through which a gas (air) in the insulation layer expanded owing to the influence of the heat generated during the power generation can escape to the outside.

DETAILED DESCRIPTION OF PREFERRED EMBODIMENT

Hereinafter, a preferable embodiment of the present invention will be described with reference to the drawings.

FIGS. 1 to 11 show the embodiment of a heat insulation cell for a fuel cell according to the present invention. In a heat insulation cell 4 for a fuel cell 1 in the present embodiment, for example, two separators (plate-like members) 20 and a seal member 13 form an insulation layer, and the heat insulation cell has a communication section 11 which is disposed in at least a part of a seal line formed by a seal member to seal the insulation layer and the outside of the heat insulation cell 4 and which connects the insulation layer to the outside.

In the embodiment described hereinafter, first the whole constitution of the fuel cell 1 including cells 2 and the heat insulation cell 4 will be described, and then the constitution of the heat insulation cell 4 in the present embodiment having the communication section 11 will be described.

Figure 1:
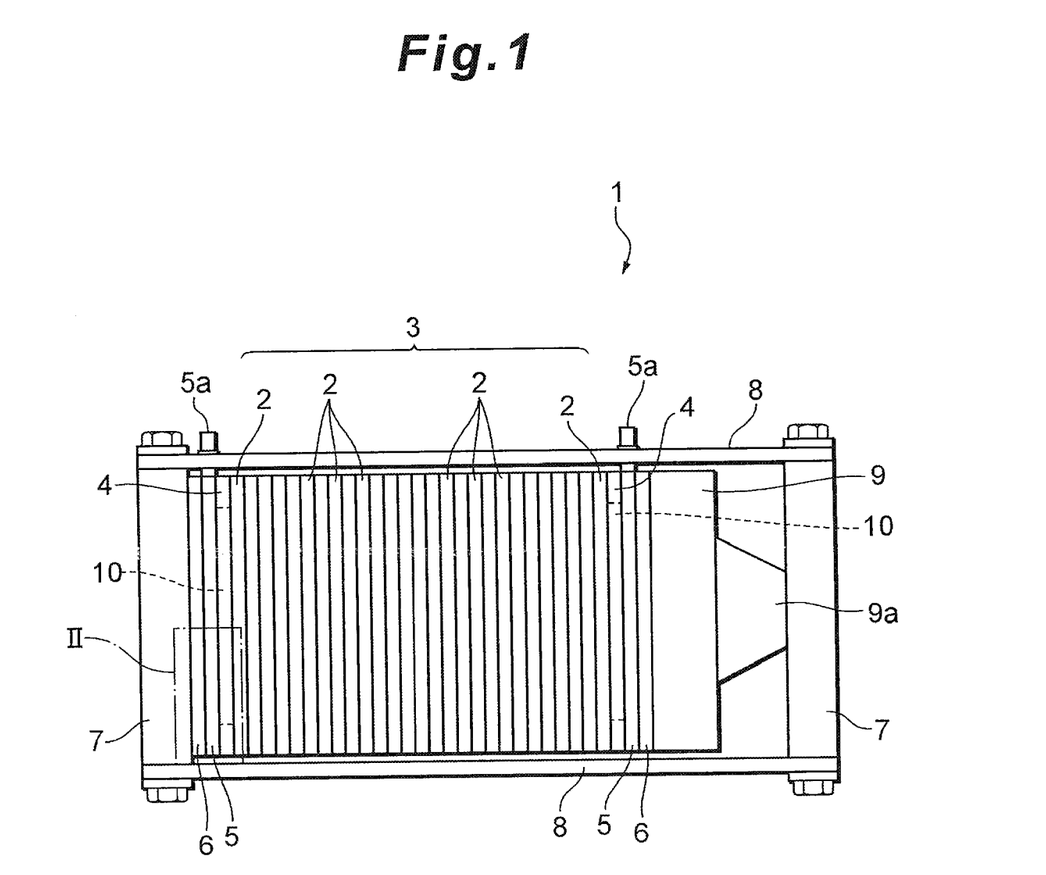
FIG. 1 is a side view showing a structure example of a fuel cell in the present embodiment.
Figure 2:
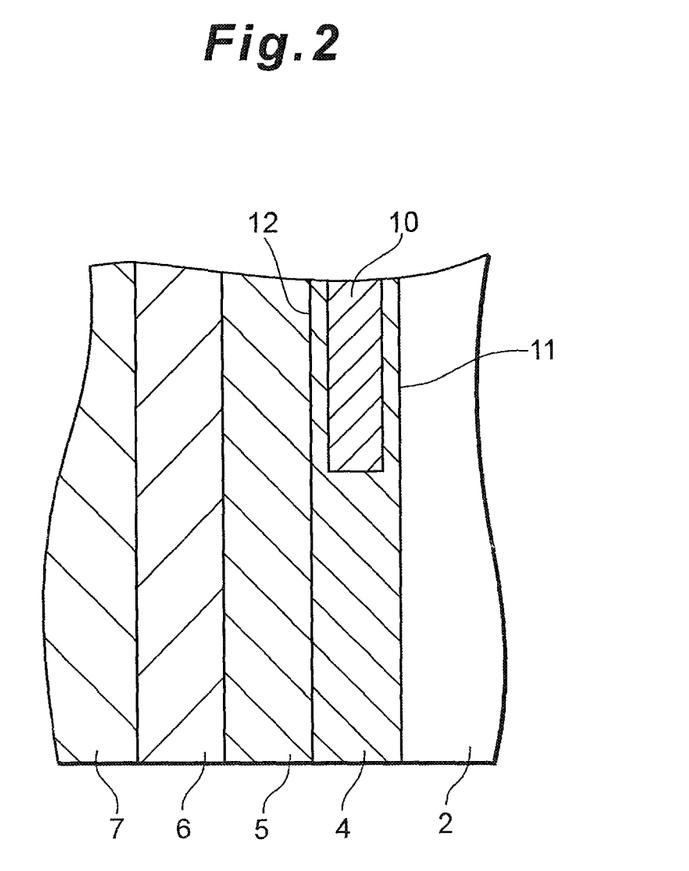
FIG. 2 is an enlarged sectional view showing a region 11 of FIG. 1

FIGS. 1, 2 show a schematic constitution of the fuel cell 1 in the present embodiment. It is to be noted that this fuel cell 1 is usable in a car-mounted power generation system for, for example, a fuel cell hybrid vehicle (FCHV), but the present invention is not limited to this example, and the present invention is usable in a power generation system to be mounted in self-sustainable bodies such as various mobile bodies (e.g., a ship, an airplane, etc.) and a robot, and further in a stationary power generation system.

The fuel cell 1 includes a cell stack member 3 in which a plurality of cells (hereinafter also referred to as the power generation cells) 2 are stacked, and on the outer sides of the end cells 2 positioned at both ends of the cell stack member 3 in a stack direction, terminal plates 5 provided with output terminals 5a, insulators (insulation plates) 6 and end plates 7 are further provided. A predetermined compressive force is added to the cell stack member 3 in the stack direction by tension plates 8 extended to connect both end plates 7 to each other. Furthermore, a pressure plate 9 and a spring mechanism 9a are provided between the end plate 7 and the insulator 6 on one end side of the cell stack member 3, so that the fluctuations of a load exerted onto the power generation cells 2 are absorbed.

Each of the power generation cells 2 is constituted of a membrane-electrode assembly (MEA) including an electrolyte membrane constituted of an ion exchange membrane and a pair of electrodes which sandwich the membrane from both surfaces, and a pair of separators 20 which sandwich this membrane-electrode assembly from the outside. Each of the separators 20 is a conductor made of, for example, a metal as a base material, has a fluid passage for supplying fuel gases such as an oxidizing gas, for example, air and a hydrogen gas to the electrodes, and performs a function of blocking the mixture of heterogeneous fluids to be supplied to the power generation cells 2 disposed adjacent to each other. According to such a constitution, in the membrane-electrode assemblies of the power generation cells 2, an electrochemical reaction occurs, and an electromotive force can be obtained. It is to be noted that this electrochemical reaction is a heat generating reaction, and hence the separators 20 are provided with fluid passages through which a refrigerant (e.g., cooling water) for cooling the fuel cell flows.

Figure 3:
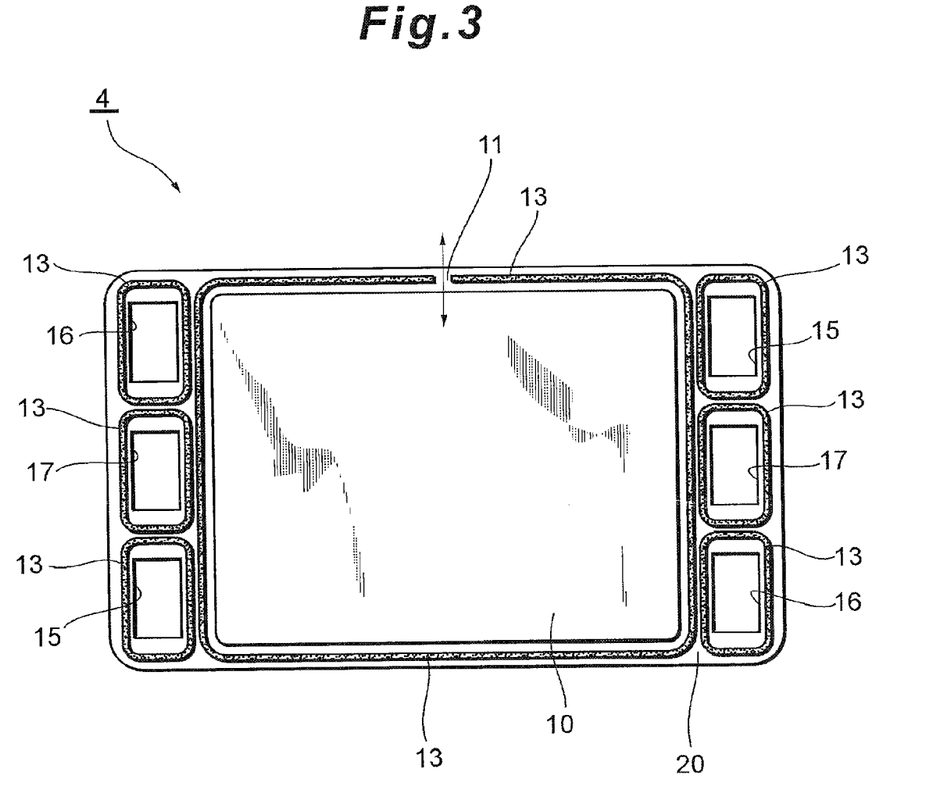
FIG. 3 is a plan view showing a schematic constitution of a heat insulation cell according to the present invention.

Furthermore, at, for example, both ends of each separator 20, there are formed manifolds (an oxidizing gas manifold 15, a fuel gas manifold 16 and a refrigerant manifold 17) through which the oxidizing gas, the fuel gas and the refrigerant flow in the cell stack direction, respectively (see FIG. 3). In the fuel cell 1 of the present embodiment, the fluids (the oxidizing gas, the fuel gas and the refrigerant) are supplied to the inlet-side manifolds 15 to 17 from fluid supplying pipes (not shown) provided in the end plate 7 disposed at one end of the fuel cell 1, and flow through the fluid passages provided in the separators 20 of the cells 2. Furthermore, the fluids are discharged from the outlet-side manifolds 15 to 17 to fluid discharging pipes (not shown) provided in the end plate 7 disposed at the other end of the fuel cell 1.

Each of the heat insulation cells 4 is provided with an insulation layer constituted of, for example, two separators 20 and the seal member 13, and performs a function of suppressing the release of heat generated during the power generation to the atmosphere or the like. That is, usually at the ends of the cell stack member 3, a temperature easily lowers by heat exchange between the ends and the atmosphere, and hence insulation layers are formed at the ends of the cell stack member 3 to suppress the heat exchange (the heat release). Such an insulation layer has a constitution in which instead of the membrane-electrode assembly, an insulation member 10 such as a conductive plate is sandwiched between a pair of separators 20 similar to those of each power generation cell 2. The insulation member 10 for use in this case preferably has excellent insulation properties, and, for example, a conductive porous sheet or the like is specifically used. Moreover, the periphery of the insulation member 10 is sealed with the seal member 13, whereby an air layer is formed. Furthermore, the peripheries of the manifolds 15 to 17 for the fluids are sealed with the seal member 13, whereby the manifolds are separated from the insulation layer. It is to be noted that the general structural portion of the heat insulation cell 4 is described herein, and the characteristic structure of the heat insulation cell 4 in the present embodiment will be described later.

It is to be noted that as the seal member 13, it is possible to use an elastic material (a gasket) which physically comes in close contact with an adjacent member (e.g., the separator 20) to seal the fluid, an adhesive which adheres to the adjacent member by chemical bonding or the like. In the present embodiment, as the seal member 13, for example, a member for physically sealing due to elasticity is employed, but instead of this member, a member for sealing due to the chemical bonding, for example, the above adhesive may be employed. However, specific examples are especially not limited to these examples, and except for these examples, for example, needless to say, a seal member referred to as a sealant, or a gel-like seal material, a liquid-like packing or the like may be used.

The terminal plates 5 are members which function as current collecting plates, and are formed into plate-like members made of a metal such as iron, stainless steel, copper or aluminum. The surface of the terminal plate 5 on the side of the heat insulation cell 4 is subjected to a surface treatment such as plating, and by such a surface treatment, a contact resistance with respect to the heat insulation cell 4 is secured. Examples of a plating material include gold, silver, aluminum, nickel, zinc and tin, and in the present embodiment, for example, tin plating is performed in consideration of conductivity, processability and inexpensiveness.

The insulators 6 are members which perform a function of electrically insulating the terminal plates 5 and the end plates 7. To perform such a function, the insulators 6 are formed into plate-like members of a resin material such as polycarbonate.

The end plates 7 are formed into plate-like members made of any one of various metals (iron, stainless steel, copper, aluminum and the like) in the same manner as in the terminal plates 5. In the present embodiment, the end plates 7 are made of, for example, copper, but this is merely one example, and the end plates may be made of another metal.

Next, the constitution of the heat insulation cell 4 in the present embodiment will be described. As described above, the heat insulation cell 4 for the fuel cell according to the present invention has the communication section 11 for connecting the outside to the insulation layer in at least a part of a seal line (a frame-like seal portion constituted of or to be constituted of the seal member 13, or a linear portion provided with the seal member 13) which seals the insulation layer and the outside of the heat insulation cell 4 (see FIG. 3). Hereinafter, the heat insulation cell 4 having such a structure will be described with respect to first to fifth embodiments (see FIGS. 4 to 11).

<First Embodiment>

Figure 4:
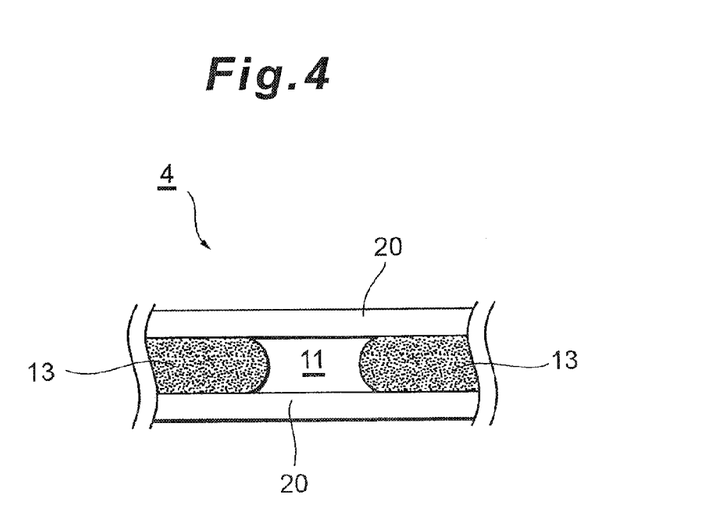
FIG. 4 is a side view showing, in the center, a communication section in a first embodiment of the present invention.

A heat insulation cell 4 of the present embodiment has a communication section 11 formed by partially disconnecting at least a part of a seal member 13 (see FIG. 4). This communication section 11 can be formed by interposing, between facing separators 20, the seal member (a packing, a gasket or the like) 13 having, for example, a length which is not sufficient for extending along a seal line once (see FIGS. 3, 4). Alternatively, when an adhesive is applied, a gap constituting an air hole is formed so as to form the communication section 11 when the gap is sandwiched between, for example, two separators 20.

The heat insulation cell 4 including this communication section 11 can suppress the deterioration of the seal function of the seal member 13 due to the influence of heat while securing the insulating function of an insulation layer. That is, in the heat insulation cell 4 of the present embodiment, when a gas (air) in the insulation layer expands owing to the influence of the heat generated during power generation, the gas can pass through the communication section 11 to escape to the outside. After the end of the operation of a fuel cell 1, when the gas (the air) in the insulation layer contracts owing to the lowering of a temperature, external air can flow into the insulation layer through the communication section 11. That is, in a conventional structure in which air exchange between a region including the insulation layer and the outside cannot be realized, a gas in a region surrounded (sealed) with the seal line expands or contracts owing to the influence of the heat, and such a change has an influence on the separators 20, whereby a contact surface pressure between an insulation member 10 and the separators 20 might change. However, according to the heat insulation cell 4 of the present embodiment, it is possible to suppress the deterioration of the seal function due to the influence of the change of the heat and pressure while securing the insulating function of the insulation layer.

<Second Embodiment>

A heat insulation cell 4 of the present embodiment is formed so that a communication section 11 formed in at least a part of a seal member 13 has a uniform width and so that a region constituting an air hole has a constant size. Specifically, on a portion provided with the communication section 11 in one of facing separators 20, for example, a pair of projecting portions (a projection) 21 forming the communication section 11 are disposed in advance (see FIG. 5). In this case, the pair of projecting portions 21 function as banks which prevent the seal member 13 from flowing into or otherwise entering the communication section (or a portion provided with the communication section) 11, so that the communication section 11 having the uniform width can be formed regardless of conditions such as the amount, length or thickness of the seal member 13 and further a temperature or a pressure during formation.

Figure 5:
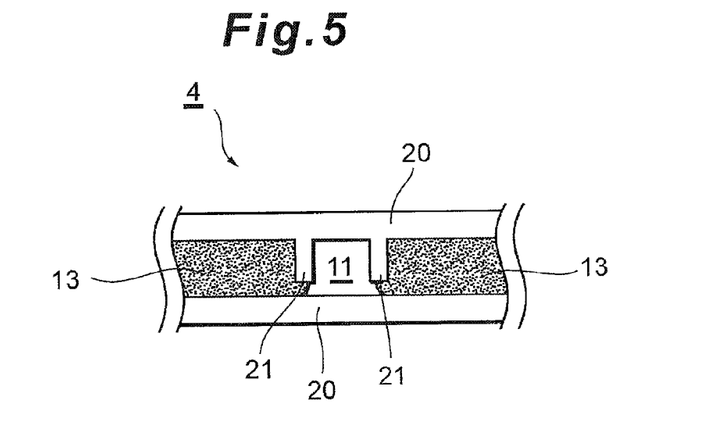
FIG. 5 is a side view showing, in the center, a communication section in a second embodiment of the present invention.

According to the heat insulation cell 4 including the communication section 11 uniformed in this manner, while securing the insulating function of an insulation layer, it is possible to more securely suppress the deterioration of the seal function of the seal member 13 due to the influence of heat. Moreover, the fluctuations of the shape or function of the communication section 11 in each product can advantageously be suppressed. Furthermore, the facing separators 20 do not come in direct contact with each other, which produces an advantage that the insulation properties of the heat insulation cell 4 can easily be secured.

<Third Embodiment>

Figure 6:
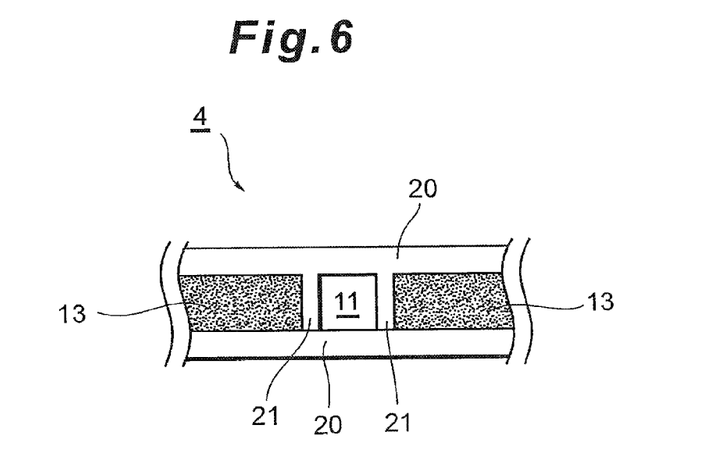
FIG. 6 is a side view showing, in the center, a communication section in a third embodiment of the present invention.
Figure 7:
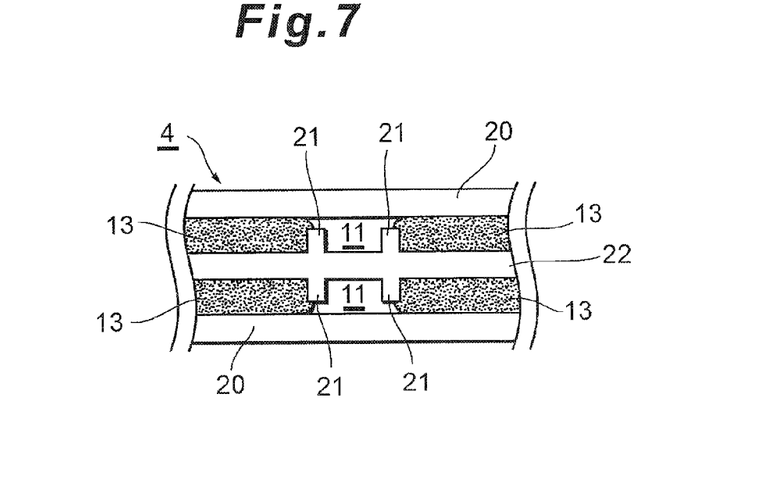
FIG. 7 is a side view showing, in the center, a communication section in a fourth embodiment of the present invention.

A heat insulation cell 4 of the present embodiment is similar to that of the above embodiment in that projecting portions (a projection) 21 are beforehand disposed on a portion provided with a communication section 11 in one of facing separators 20, but the projecting portions 21 have such a height as to abut on the surface of the facing separator 20 (see FIG. 6). In this case, the projecting portions 21 eliminate a gap around the communication section 11 to decrease a room which a seal member 13 enters, so that the projecting portions function so as to securely suppress the flowing of the seal member 13. In addition, even when such a pressure as to sandwich the separators 20 is sufficiently added during the manufacturing of the heat insulation cell 4, the projecting portions 21 function as stoppers to suppress the deformation of the separators 20. An insulation member 10 is sufficiently compressed and joined while the seal member 13 does not easily flow, whereby a seal performance can be improved.

According to the heat insulation cell 4 including the communication section 11 uniformed in this manner, while securing the insulating function of an insulation layer, it is possible to further securely suppress the deterioration of the seal function of the seal member 13 due to the influence of heat. Moreover, the fluctuations of precision in the shape or function of each product can advantageously be suppressed.

<Fourth Embodiment>

In a heat insulation cell 4 of the present embodiment, a communication section constituting member 22 is disposed separately from a seal member 13 between facing separators 20 (see FIGS. 7 to 10). In this communication section constituting member 22, projecting portions (a projection) 21 similar to those described above are disposed on a portion provided with a communication section 11.

The communication section constituting member 22 is preferably formed of a member (e.g., a resin frame or the like) having insulation properties more excellent than those of at least the separators 20. In addition to the insulation properties of the communication section constituting member 22 itself, the heat insulation cell 4 of the present embodiment can exert a high insulating function because the communication section constituting member 22 is sandwiched between the separators 20 to increase the thickness of an insulation layer. It is to be noted that the communication section constituting member 22 may be a plate-like member which covers the whole surface of a seal line, or a frame-like member superimposed on at least a seal line.

Hereinafter, a specific structure will be described. In a heat insulation cell 4 shown in, for example, FIG. 7, a communication section constituting member 22 provided with a pair of projecting portions 21 on each of both surfaces thereof is sandwiched between separators 20 (see FIG. 7). Moreover, seal members 13 are provided on both the surfaces of the communication section constituting member 22, respectively. The projecting portions 21 of the surfaces function as banks which prevent the seal member 13 from flowing into or otherwise entering a communication section (or a portion provided with the communication section) 11, so that the communication section 11 having a uniform width can be formed regardless of conditions such as the amount, length or thickness of the seal member 13 and further a temperature or a pressure during formation. In addition, this heat insulation cell 4 includes the communication sections 11 in at least two portions thereof, and hence has an advantage that air easily flows during expansion or contraction.

Figure 8:
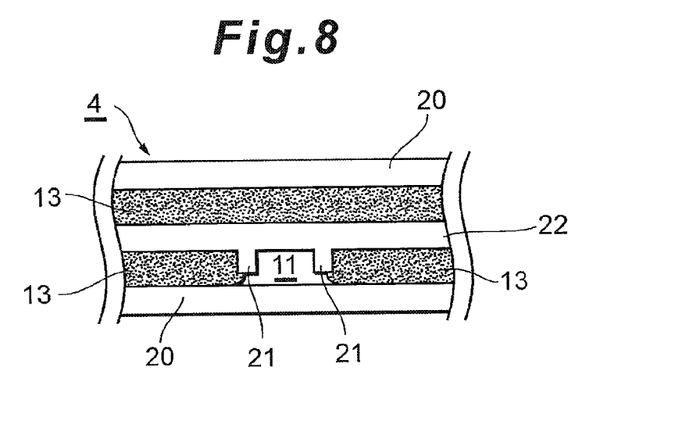
FIG. 8 is a side view showing another example of the communication section in the fourth embodiment of the present invention.

Moreover, in a heat insulation cell 4 shown in FIG. 8, a communication section constituting member 22 provided with a pair of projecting portions 21 only on one surface thereof is sandwiched between separators 20 (see FIG. 8). Seal members 13 are provided on both surfaces of the communication section constituting member 22, respectively. The projecting portions 21 formed on the one surface function as banks which prevent the seal member 13 from flowing into or otherwise entering a communication section (or a portion provided with the communication section) 11, so that the communication section 11 having a uniform width can be formed regardless of conditions such as the amount, length or thickness of the seal member 13 and further a temperature or a pressure during formation. In this case, the seal member 13 on the back surfaces of the projecting portions 21 is continuously formed without being disconnected halfway (see FIG. 8).

Figure 9:
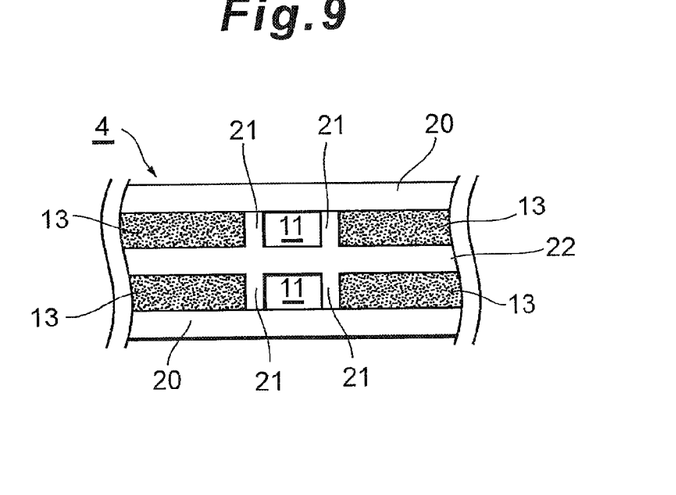
FIG. 9 is a side view showing still another example of the communication section in the fourth embodiment of the present invention.

In a heat insulation cell 4 shown in FIG. 9, a communication section constituting member 22 provided with a pair of projecting portions 21 on each of both surfaces thereof is sandwiched between separators 20, and the projecting portions 21 have a height determined so that the projecting portions abut on the facing surfaces of the separators 20 to obtain an insulation layer having a constant thickness (see FIG. 9). In this case, the projecting portions 21 eliminate gaps around communication sections 11 to decrease rooms which seal members 13 enter, and hence function so as to securely suppress the flowing of the seal members 13, so that the communication sections 11 having a uniform width can be formed. In addition, even when such a pressure as to sandwich the separators 20 is sufficiently added during the manufacturing of the heat insulation cell 4, the projecting portions 21 function as stoppers to suppress the deformation of the separators 20. An insulation member 10 is sufficiently compressed and joined while the seal members 13 do not easily flow, whereby a seal performance can be improved. In addition, this heat insulation cell 4 includes the communication sections 11 in at least two portions thereof, and hence has an advantage that air easily flows during expansion or contraction.

Figure 10:
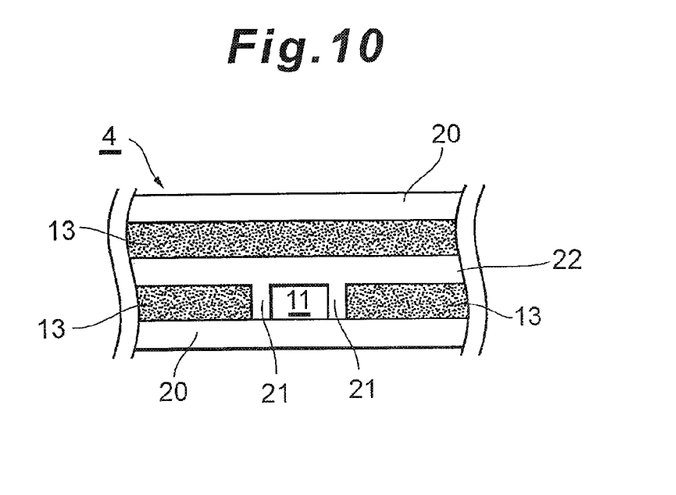
FIG. 10 is a side view showing a further example of the communication section in the fourth embodiment of the present invention.

In a heat insulation cell 4 shown in FIG. 10, a communication section constituting member 22 provided with a pair of projecting portions 21 only on one surface thereof is sandwiched between separators 20, and this pair of projecting portions 21 have a height determined so that the projecting portions abut on the surface of the facing separator 20 (see FIG. 10). In this case, the projecting portions 21 eliminate a gap around the communication section 11 to decrease a room which a seal member 13 enters, so that the projecting portions function so as to securely suppress the flowing of the seal member 13, and the communication section 11 having a uniform width can be formed regardless of conditions such as the amount, length or thickness of the seal member 13 and further a temperature or pressure during formation. In this case, the seal member 13 on the back surfaces of the projecting portions 21 is continuously formed without being disconnected halfway (see FIG. 10).

It is to be noted that in the above fourth embodiment, the heat insulation cell 4 having the structure including the projecting portions 21 formed on one surface or both surfaces of the communication section constituting member 22 has been illustrated (see FIGS. 7 to 10), but a similar function can be realized by a structure different from this structure. That is, although not especially shown, for example, similar projecting portions 21 may be formed on one or both of the separators 20 instead of forming the projecting portions 21 on the communication section constituting member 22. Alternatively, the projecting portions 21 may be formed on both of the communication section constituting member 22 and the separator 20.

<Fifth Embodiment>

In the above-mentioned embodiments, a structure has been illustrated in which at least a part of a seal member (a seal line) 13 is partially disconnected (discontinued) to form a communication section 11, but a structure can be realized in which the communication section 11 having such a specific shape is formed and in which a gas (air) can substantially be circulated and changed. A specific example will be described. In a heat insulation cell 4 of the present embodiment shown in FIG. 11, a seal member 13 is not provided around an insulation member 10, but is provided only around manifolds 15 to 17 which require a seal line.

Figure 11:
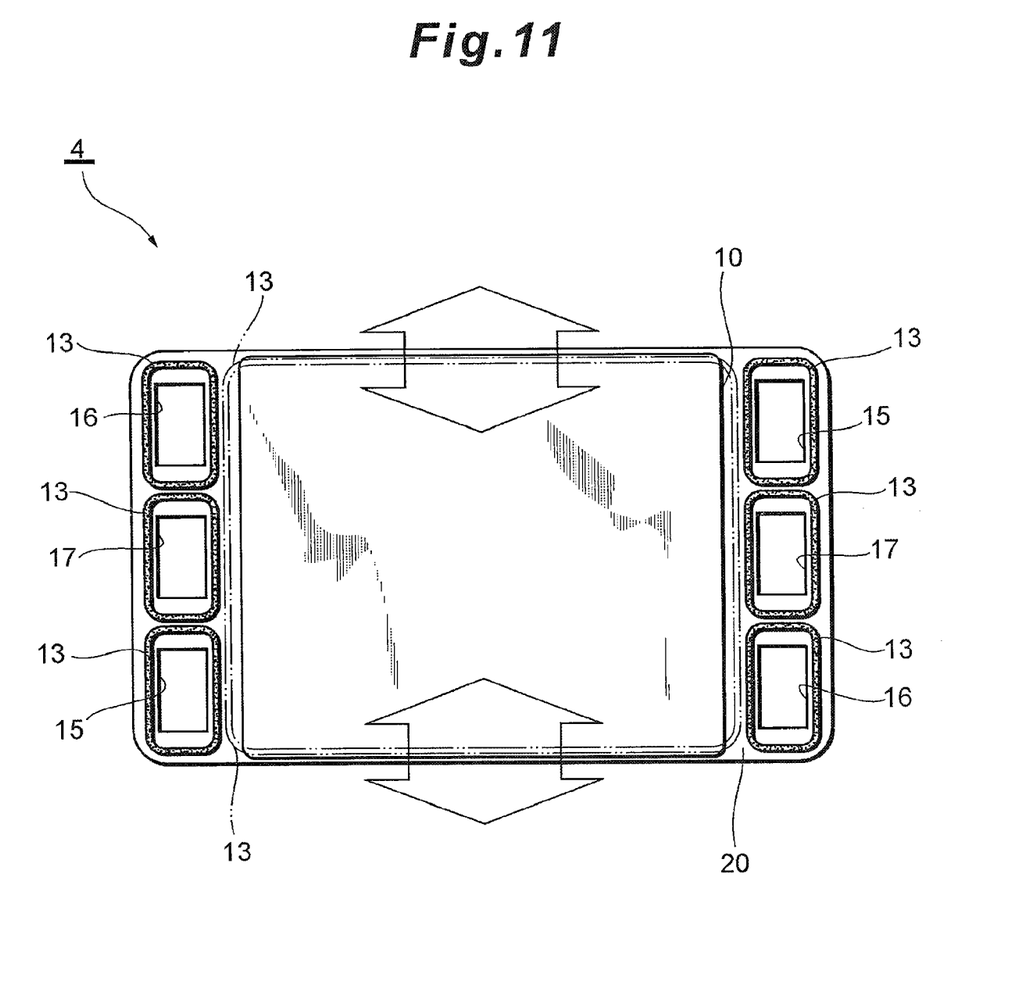
FIG. 11 is a plan view showing a schematic constitution of a heat insulation cell in a fifth embodiment of the present invention.

Thus, in the heat insulation cell 4 in which the seal line around an insulation layer is so-called abolished, the insulation layer (including the insulation member 10) is not closed with the seal line, and hence the gas (the air) can pass through the side portion of the insulation member 10 to circulate between the insulation layer and the outside of the layer (see FIG. 11). In other words, in the heat insulation cell 4 of the present embodiment, a communication section 11 is formed along the side portions of a separator 2 (both side portions which are not provided with the manifolds 15 to 17), and the insulation member 10 is disposed in the communication section 11, whereby while securing the insulating function of the insulation layer, it is possible to suppress the deformation of the separators 20 caused by the expansion or contraction of the gas (the air) due to the influence of heat.

It is to be noted that as the insulation member 10, except for the above-mentioned conductive insulation member constituted of a resin frame, an insulation film, or a plate-like member made of a Teflon (trademark) material may be used. Alternatively, a conductive insulation member having fine air holes may be used. Moreover, the insulation member 10 preferably has a size approximately equal to that of the membrane-electrode assembly of each power generation cell 2, and preferably has a broad shape to such an extent that the member is disposed beyond a virtual seal line (see FIG. 11). Furthermore, this insulation member 10 is provided between the separators 20, and functions so as to suppress the deformation of the separators 20.

As described above, the heat insulation cell 4 for the fuel cell of the embodiments includes the communication section 11 through which the gas can circulate, and hence air exchange between a thermally expanding or contracting internal gas (air) and outside air can be performed to suppress the change of an internal pressure. In consequence, it is possible to suppress the deterioration of the seal function in the heat insulation cell 4 due to the heat generated during the power generation. Moreover, in a case where the communication section 11 is defined by the projecting portions 21 so that the communication section has a constant width or a constant region, fluctuations among products can be eliminated, and the gas can stably be circulated. Needless to say, the above heat insulation cell 4 sufficiently exerts an inherent insulating function of suppressing the release of the reaction heat of each power generation cell 2 from the cell stack member 3 to improve the low-temperature startup properties of the fuel cell 1.

It is to be noted that the above embodiment is one example of the preferable embodiment of the present invention, but the present invention is not limited to this embodiment, and can variously be modified without departing from the scope of the present invention. For example, in the present embodiment, the two projecting portions 21 arranged side by side have been described as the specific example of the projection, but this example is merely a preferable example. In short, there is not any special restriction on the projection as long as the communication section 11 of the gas can be formed while at least a part of the seal member (the seal line) 13 is disconnected (discontinued). Therefore, the shape of the projection is not limited to the above shape, and there is not any special restriction on the number and installing places of the projecting portions. One example will be described. When the projection is formed to have round tips and abuts on the separator (the plate-like member) 20 facing the projection, the projection can prevent the heat from being easily transmitted from one separator 20 to the other separator 20, while exerting the function of a stopper.

Moreover, for example, in the first embodiment, the insulation member 10 smaller than the seal member (the seal line) 13 has been illustrated (see FIG. 3), but as another example, the insulation member 10 having a size approximately equal to that of the seal member (the seal line) 13 or the like may be used and superimposed on the communication section 11. For example, in a structure in which a part of an insulation member is sandwiched between two plate-like members (separators), the sandwiched part of the insulation member can function so as to suppress the deformation of the separators due to the influence of an external force.

Industrial Applicability

According to the present invention, it is possible to suppress the deformation of a separator (a plate-like member) in a heat insulation cell due to heat generated during power generation and the deterioration of a seal function.

Therefore, the present invention can broadly be utilized in a heat insulation cell for a fuel cell having such a demand and a manufacturing method of the same.

The invention claimed is:

1. A heat insulation cell for a fuel cell in which an insulation layer is constituted of two or more plate-like members, a heat-insulating member sandwiched between two adjacent plate-like members, and a seal line formed by a seal member between the two adjacent plate-like members that seals the insulation layer and the outside of the heat insulation cell,
the heat insulation cell being provided with a communication section which is disposed in at least a part of the seal line and connects the insulation layer to the outside;
wherein at least one of the two adjacent plate-like members has at least two projections that define the communication section, wherein the projections project in a direction towards the other of the two adjacent plate-like members.

2. The heat insulation cell for the fuel cell according to claim 1, wherein the projections do not come in contact with the other of the two adjacent plate-like members.

3. The heat insulation cell for the fuel cell according to claim 1, wherein the projections come in contact with the other of the two adjacent plate-like members.

4. The heat insulation cell for the fuel cell according to claim 1, wherein the heat-insulating member is disposed in the communication section.

5. The heat insulation cell for the fuel cell according to claim 4, wherein the seal line is formed only in the outer periphery of a manifold for a reactant gas or a refrigerant.

6. The heat insulation cell for the fuel cell according to claim 1, wherein the seal line is formed in the periphery of the heat-insulation member.

* * * * *

UNITED STATES PATENT AND TRADEMARK OFFICE
CERTIFICATE OF CORRECTION

PATENT NO.       : 8,697,304 B2
APPLICATION NO. : 12/521850
DATED            : April 15, 2014
INVENTOR(S)      : Chisato Kato Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this

Twenty-ninth Day of September, 2015

Michelle K. Lee
*Director of the United States Patent and Trademark Office*